United States Patent [19]

Bock

[11] Patent Number: 4,553,953
[45] Date of Patent: Nov. 19, 1985

[54] CHAIN-BELT

[75] Inventor: Thomas J. Bock, Streamwood, Ill.

[73] Assignee: Borg-Warner Corporation, Chicago, Ill.

[21] Appl. No.: 645,189

[22] Filed: Aug. 29, 1984

[51] Int. Cl.[4] .............................................. F16G 5/16
[52] U.S. Cl. ..................................... 474/201; 474/242
[58] Field of Search ............... 474/245, 244, 242, 202, 474/201

[56] References Cited

U.S. PATENT DOCUMENTS

| 3,720,113 | 3/1973 | Van Doorne et al. | 474/242 |
| 4,313,730 | 2/1982 | Cole, Jr. et al. | 474/201 |
| 4,427,401 | 1/1984 | Hendricks et al. | 474/201 |

FOREIGN PATENT DOCUMENTS 974517 11/1964 United Kingdom ................ 474/201

Primary Examiner—Stuart S. Levy
Assistant Examiner—Katherine Jaekel
Attorney, Agent, or Firm—James A. Geppert

[57] ABSTRACT

A metal chain-belt for drivingly connecting the pulleys of a pulley transmission, each pulley of which is composed of a pair of flanges, the chain-belt comprising a carrier composed of interleaved sets of links and pulley flange engaging members, each of which is a pair of back-to-back joined C-shaped member, the arms of the latter engaging the pulley flanges. The longitudinal length of the top arms of a pair of members substantially equals the pitch of the chain; the longitudinal length of the bottom arms is less to permit the belt to articulate.

8 Claims, 7 Drawing Figures

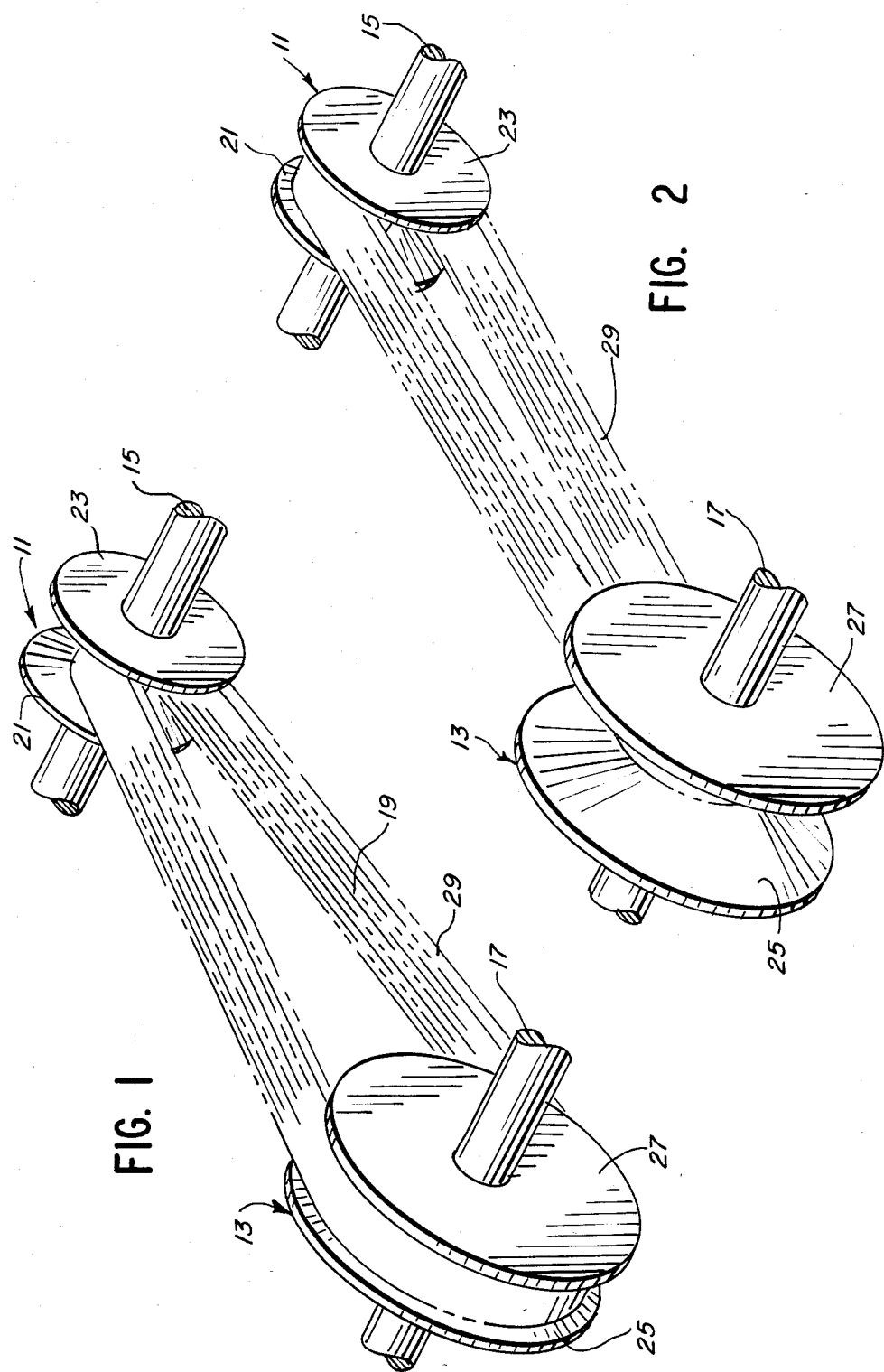

CHAIN-BELT

BACKGROUND OF THE INVENTION

Variable pulley transmissions for transferring torque from an input or drive shaft to an output or driven shaft have been used for some time. In these transmissions, a first pulley constructed of a pair of flanges is mounted on the input shaft such that at least one of its flanges is axially movable with respect to its other flange. A second, similarly constructed and adjustable pulley is mounted on the output shaft. A flexible belt connects the two pulleys to transfer torque therebetween when the input shaft is driven. As the effective diameter of one pulley is changed and, simultaneously, the effective diameter of the other pulley is changed in the opposite direction, the drive ratio between the input and output shafts is adjusted in a smooth, continuous manner.

Automotive engineers have long recognized that the maximum operating efficiency of the engine could be achieved if the transmission could be controlled by adjusting to different loads and speed ratios, such that the engine is maintained and operated at its maximum efficiency operating conditions. This has not been possible when a conventional geared transmission is teamed with an engine. In the conventional geared transmission, the drive ratio is adjusted in discrete steps, rather than continuously. Accordingly, efforts have been directed to the use of a continuously variable transmission (CVT) of the type described above. These efforts have resulted in the production and marketing in Europe of the Daf passenger car, using a flexible, continuous rubber belt to drivingly interconnect the pulleys. Such a belt is subject to wear by reason of the torque it must handle and operates under severe temperature, vibration and other adverse conditions. To improve the belt life, efforts have been channeled to produce a flexible belt of metal, and some of these efforts are described in the patent literature.

Flexible metal belts for use with CVTs are generally of two varieties, those referred to as "push" belts and those referred to as "pull" belts. An example of a push belt is described in Van Doorne et al U.S. Pat. No. 3,720,113 and an example of a pull belt is described in Cole, Jr. et al U.S. Pat. No. 4,313,730. The Van Doorne et al belt comprises an endless carrier constructed of a plurality of nested metal bands, and an endless array of load blocks longitudinally movable along the carrier. Each block has edge surfaces for frictionally engaging the pulley flanges of a pulley transmission to transmit torque between the pulleys. The pull belt of Cole, Jr. et al utilizes an endless chain as the carrier, the sets of links of which are pivotally interconnected by pivot means, shown as round pins. Generally trapezoidal (when viewed from the front) load blocks encircle the links; however the load blocks are constrained against longitudinal movement along the chain by the pivot means.

The push belt as described is relatively expensive to manufacture because the nested carrier bands are precisely matched to each other. Such a belt must be installed and/or replaced as a complete, endless loop, and thus disassembly of parts of the pulley transmission is required, not only for the initial assembly, but also for replacement due to failure of one or more load blocks or one or more of its carrier bands.

The pull belt offers a less expensive alternative to the push belt. No precise matching of carrier parts is required. The belt can be assembled with a finite length, positioned around the pulleys, and the ends then connected by a pivot member. Thus disassembly of the pulleys is not required either for initial installation or for replacement of a belt.

Theoretically a load block, either on a push belt or a pull belt, entering a pulley is tangentially oriented with respect to the pulley. That is, the length dimension of the block is perpendicular to a radial line extending outwardly from the center of the pulley. Actually, the block may tilt and enter the pulley at some other angle. When the block's "window" or "windows", i.e., the opening or openings in which the carrier is located, are made with square defining edges, the tilting of the blocks cause the top and/or the bottom edges to dig into and damage the carrier, seriously affecting the carrier's ability to transmit torque. This weakens the carrier and leads to premature failure of the carrier. One attempt (not yet proven) to solving this problem is to make the top and bottom window defining surfaces slightly round or arcuate. This adds to the manufacturing costs of the belt.

Load blocks, during their torque transmitting operation, are pulled downwardly toward the center of each pulley and are thus subjected to transversely applied compressive loads which unduly stress the blocks and which can lead to their failure. The compressive stresses on load blocks can cause the lower, strut-like portion, to sag, twist or otherwise be distorted which can lead to failure of the block. One attempt to eliminate this result is to construct load blocks with multiple windows and to divide each set of links into sub-sets, the windows being separated by a generally centrally disposed load block column, such a column maintains the generally flat strut in its proper and desirable undistorted form. In the multiple window block construction, the number of links of a given thickness for a given width belt is determined by the window sizes. The multiple window block construction has proved successful in reducing the number of load block failures due to distortion; however, because the number of links in each set determines the ultimate tensile strength of the assembly, there is a limitation in the tensile strength of a given width belt.

SUMMARY OF THE INVENTION

According to the invention to be described herein, an improved chain-belt especially suitable for use to drivingly interconnect the pulleys of a pulley transmission is constructed to exhibit reduced stress levels for equivalent loading when compared to a chain-belt similar to that taught by Cole, Jr. et al, supra. Also, the chain-belt of this invention has a higher tensile strength than a chain-belt of equal width, whether (1) utilizing links of the same pitch and thickness as one of the Cole, Jr. et al construction, or (2) using multiple window-load blocks in which the sets of links are arranged as sub-sets of links.

The chain-belt of this invention comprises a carrier having a plurality of interleaved sets of links, the adjacent sets of which are joined by pivot means to permit articulation. Each set is arranged as a pair of spaced sub-sets, and pulley flange engaging means, equivalent in function to the load blocks described in the aforesaid Cole, Jr. et al patent, are associated with the carrier. Each pulley flange engaging means comprises a pair of back-to-back, generally C-shaped members joined to one another. Each member has a pair of arms joined to its back or body portion. The links of the carrier are each provided with apertures for receiving the pivot means. The open ends of the pulley flange engaging members face outwardly away from one another, and the terminal ends of the arms have surfaces adapted to engage the respective pulley flanges. Each arm of a C-shaped member traverses a sub-set of links.

The top arm of each C-shaped member is wider (in the longitudinal direction) than its lower arm and is substantially equal in width to the pitch of the chain. "Pitch" is used in the conventional manner to mean the distance between the centers of adjacent pivot means when the belt, or a portion of the belt, is straight. Thus, the top arms of adjacent members substantially abut one another when the chain-belt is in the run between pulleys, and prevent the chain, i.e., the carrier, from pivoting or "back bending" in the direction opposite to the normal pivoting direction.

The lower arm of each C-shaped member, being narrower than the upper arm, permits articulation of the assembly. Because the ends of the C-shaped members are open (as opposed to a conventional load block which includes an extended, continuous edge portion) a greater number of links of a given thickness can be stacked transversely across the carrier of a given width when compared to the number of links and the width of the usual, conventional chain-belt. For example, in a multiple window block, one suggested lacing is 4-5, 5-4. This is to say, each set of links may include two sub-sets, one with four links and a second with five links. In one set, a first sub-set containing 4 links is interleaved with a five-link sub-set in the next adjacent set of links. The second, five-link sub-set of the one set is interleaved with four-link sub-set of the next adjacent set. Thus every set of links contains a total of 9 links. The chain-belt of this invention, having the same width and constructed of identical links, i.e., thickness, can be laced 5-5, 5-5 and thus a set of links contains 10 links, which serves to increase the tensile strength of the carrier.

BRIEF DESCRIPTION OF THE DRAWINGS

FIGS. 1 and 2 are perspective illustrations of a continuously variable transmission (CVT) in extreme drive ratios;

DETAILED DESCRIPTION OF THE PREFERRED EMBODIMENT

Figure 7:
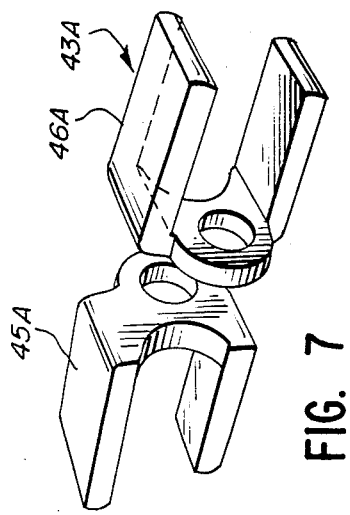
FIG. 7 is an isometric illustration of an alternate form of the pulley flange-engaging means usable in the chain-belt illustrated in FIGS. 3, 4 and 5.

FIGS. 1 and 2 show schematically a continuously variable transmission (CVT) in the extreme drive ratios, and particularly a pair of pulleys 11 and 13 mounted on shafts 15 and 17 and interconnected by a belt or chain-belt 19. One shaft is a drive shaft and the other is a driven shaft. Pulley 11 comprises sheaves or flanges 21 and 23 while pulley 13 comprises sheaves or flanges 25 and 27. Each sheave or flange is generally conical, so that the edges 29 of the belt or chain-belt 19 are tapered and frictionally engage the sheave or flange surfaces. At least one sheave or flange of each pulley is axially movable with respect to the other, so that an infinite number of drive ratios can be provided between the shafts within the limits of the pulley dimensions. In an actual variable pulley transmission, mechanical, electrical or hydraulic means are provided for axially positioning the movable flanges to provide the various drive ratios. Such means are beyond the purview of this invention and will not be described herein.

Figure 3:
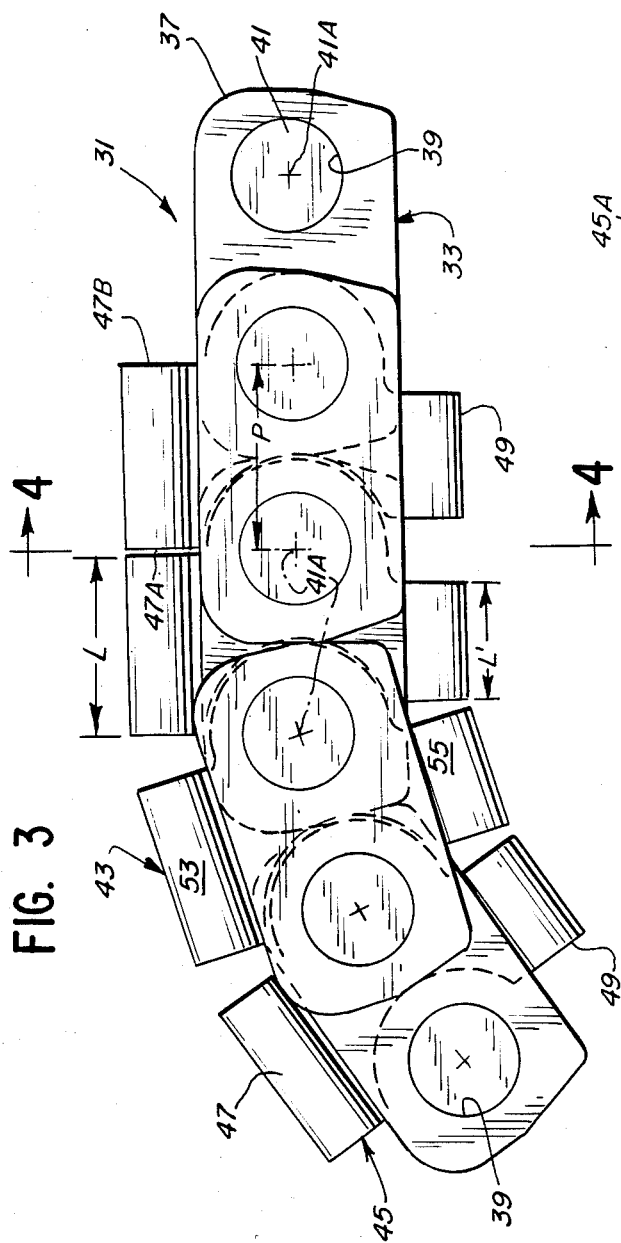
FIG. 3 is a side elevational view of a segment of a chain-belt according to this invention.
Figure 5:
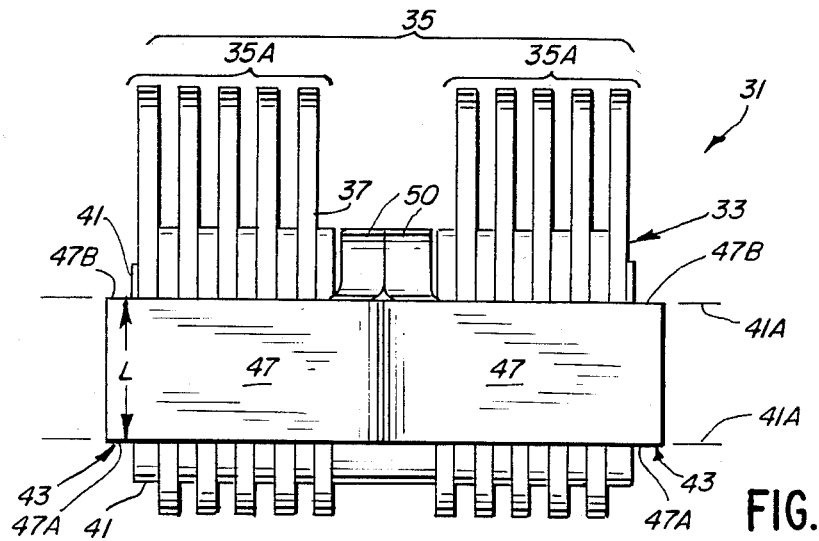
FIG. 5 is a plan view of a portion of the chain-belt of FIG. 3.
Figure 4:
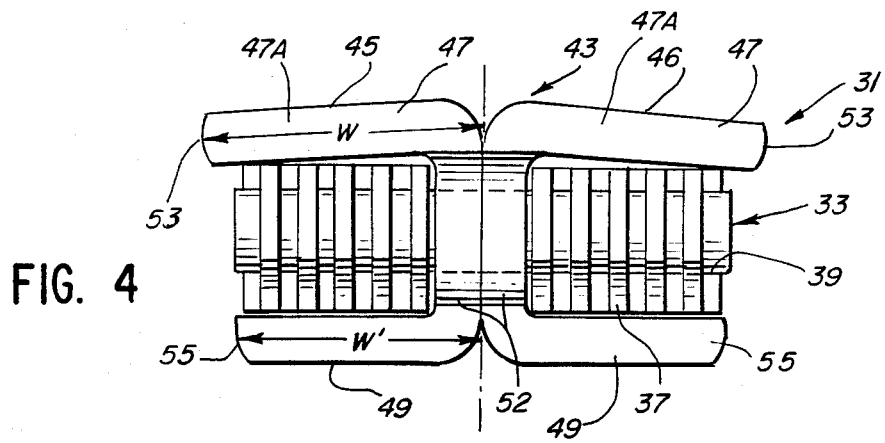
FIG. 4 is a cross-sectional view taken on line 4—4 of FIG. 3.

The novel chain-belt of this invention is best illustrated in FIGS. 3 to 5, inclusive. The chain-belt, only a segment of a closed loop being shown identified as 31, comprises a carrier 33 composed of a plurality of sets 35 of links 37, the adjacent sets of which are interleaved. Each link 37 defines a pair of apertures 39, and the apertures at one end of the links in a set are transversely aligned with the apertures in one end of the interleaved set of links to receive a pivot means 41 which permits articulation of the assembly. The pivot means 41 is illustrated as a round pin which can be replaced, if desired, with a pin and rocker structure, both being well known in the art.

Figure 6:
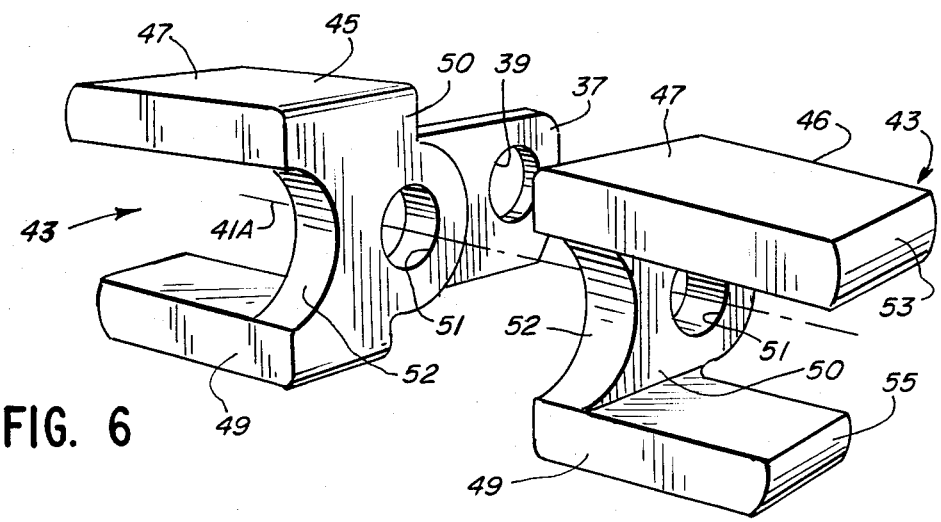
FIG. 6 is an isometric illustration of the two parts of a pulley flange-engaging means, together with one of the links in the carrier, usable in the chain-belt illustrated in FIGS. 3, 4 and 5.

In the chain-belt of this invention, each set 35 of links is divided into a pair of spaced sub-sets 35A (as best seen in FIG. 5) to accommodate a novel pulley flange engaging means 43. Each pulley-engaging means 43 comprises a pair of back-to-back, generally C-shaped members 45 and 46 (see especially FIG. 6), one being a mirror image of the other, which are joined together to provide a structure open at both sides or ends, i.e., open toward the pulley flanges. Each member 45 and 46 traverses a sub-set of links. Each C-shaped member 45 or 46 comprises an upper, top portion or arm 47, a lower, bottom portion or arm 49, and a back or body portion 50 joining the top and bottom arms. A suitable aperture 51 is provided in the back portions 50 for receiving the pivot means 41. The top arms have a width W greater than the width W' of the bottom arms and have a longitudinal length L (FIG. 3) greater than that length L' of the bottom arms. The length L is substantially equal to the pitch P of the carrier 33, i.e., the distance between centers of adjacent pivot means 41 when the carrier is planar, as shown in the right portion of FIG. 3. The back portions 50 of each means 43 are longitudinally oriented, as can be seen in the drawings, and are shaped at 52 to partially encircle the next adjacent pivot means. The means 43 are so oriented that edge surfaces 47A and 47B of the upper arms 47 are each aligned with a projection of a pivot axis 41A of the carrier, (see FIG. 3). The top arms 47 of the next adjacent means 43 substantially abut one another when the chain carrier is straight and thus prevent back bending of the assembly. Because L' is less than the pitch P, articulation of the chain-belt is permitted, so that it can wrap the pulleys of the transmission. In a complete loop the expressions "top" and "bottom" refer, respectively, to the outside or exterior of the loop and the inside or interior of the loop.

The terminal end surfaces 53 and 55 of the upper and lower arms 47 and 49 drivingly engage the pulley sheaves or flanges. They may be slightly curved from top-to-bottom, as when looking at them along the length of the chain-belt (see FIGS. 4 and 6), so as to each, at least initially, have line contact with the pulley flanges. The top arm 47 of each C-shaped member angles downwardly from the juncture of the backs. This resists the tendency of the arms of the C-shaped member to spread apart under compressive loads which may be applied to the chain-belt by the pulley flanges.

FIG. 7 illustrates a modification of the pulley flange engaging means and is identified as 43A. While each C-shaped member 45 and 46 previously described is a mirror image of the other, the C-shaped members 45A and 46A of FIG. 7 are the same, thus reducing the number of different parts in a chain-belt. The other features of a chain-belt using the FIG. 7 modification are the same as before described.

Because of the configuration of the pulley engaging means 43 or 43A, it is possible to produce a chain-belt of higher tensile strength than a chain-belt using the more conventional load blocks, both being constructed of identical links, i.e., identical as to pitch, metal guage, width and length. For example, a typical chain-belt using a block having a pair of windows, each encircling a sub-set of links, is laced 4-5, 5-4, etc. (as explained above) Because of the open-ended pulley-engaging members of this invention, it is possible to lace the chain in a 5-5, 5-5 pattern, so as to have 10 links per set, within the same envelope. Thus an increase in the number of links correspondingly increases the tensile strength of the assembly.

I claim:

1. A power transmission chain-belt especially adapted to drivingly connect the pulleys of a pulley transmission wherein each pulley is constructed of a pair of generally conical flanges, said chain-belt comprising:
    a plurality of sets of links, the adjacent sets of which are interleaved with one another;
    each set of links defining a pair of sub-sets of links and each pair of sub-sets of links defining a space therebetween; and
    pulley-engaging means associated with each pair of sub-sets of links to drivingly engage said pulley flanges as the chain-belt wraps a pulleys, said pulley-engaging means comprising a pair of generally C-shaped members, each member having a pair of spaced arms and a body portion joining the arms, the body portions of each pair abutting one another and each defining an aperture, pivot means extending through said apertures and through adjacent sets of interleaved links to thus permit articulation of the chain-belt; such that each arm of each member traverses a sub-set of links, and each arm has an end for engaging a pulley flange.

2. A power transmission chain-belt as recited in claim 1, wherein each C-shaped member has one arm longer than the other and the longer arms of each pair of C-shaped members face outwardly away from one another.

3. A power transmission chain-belt as recited in claim 1, in which each C-shaped member has one arm longitudinally longer than the other, the shorter of the arms being disposed so as to define at least a portion of the interior of the chain-belt.

4. A power transmission chain-belt as recited in claim 3, in which the longer arms are disposed so as to define the exterior of the chain-belt.

5. A power transmission chain-belt as recited in claim 4, wherein the arms defining the exterior of the chain-belt substantially abut one another except when wrapping a pulley.

6. A power transmission chain-belt as recited in claim 4, wherein the distance between pivot centers defines the pitch of the chain-belt and the length of the longer arms is substantially equal to the pitch.

7. A power transmission chain-belt as recited in claim 1, in which the spacing of said pair of arms is less at their pulley engaging ends than at their juncture with their body portions.

8. A power transmission chain-belt as recited in claim 7 wherein each top arm angles downwardly from its body portion.

* * * * *